United States Patent

Smith

[15] 3,640,718
[45] Feb. 8, 1972

[54] SPECTRAL SENTIZATION OF PHOTOSENSITIVE COMPOSITIONS

[72] Inventor: George H. Smith, Maplewood, Minn.

[73] Assignee: Minnesota Mining and Manufacturing Company, St. Paul, Minn.

[22] Filed: Apr. 10, 1968

[21] Appl. No.: 720,377

[52] U.S. Cl. ..................96/89, 96/1 R, 96/48 HD, 96/63, 96/88, 96/90, 96/115 P
[51] Int. Cl. .................................................G03c 1/72
[58] Field of Search ..................96/88, 89, 90, 115 P

[56] References Cited

UNITED STATES PATENTS 3,526,506  9/1970  Workman..................................96/90

*Primary Examiner*—Norman G. Torchin
*Assistant Examiner*—John Winkelman
*Attorney*—Kinney, Alexander, Sell, Steldt & Delahunt

[57] ABSTRACT

As a spectral sensitizer for photosensitive compositions containing a photolyzable organic halogen compound, at least one aromatic polycyclic compound having an ionization potential below about 7.4 is used. Preferred are colored, linear fused-ring polynuclear carbocyclic compounds (acenes) which are essentially unreactive with the organic halogen in the dark under room conditions.

9 Claims, No Drawings

SPECTRAL SENTIZATION OF PHOTOSENSITIVE COMPOSITIONS

This invention relates to a new class of sensitizers for the photolysis of organic halogen compounds. In particular this invention relates to sensitizers which extend the photolysis of organic halogen compounds to higher wavelengths of light.

Organic halogen compounds are widely used in the graphic arts field to produce commercially useful photosensitive constructions. They may be used as photoinitiators for free radical photography (e.g., printout and bleach systems), free radical photopolymerization, cationic photopolymerization and photoinduced acid catalyzed reaction of many types. Various photosensitive products useful in printing, duplicating, copying and other imaging systems can be prepared with such organic halogen compounds.

Organic halogen compounds are known to photodissociate to give free radical halogen, such as free radical bromine and chlorine, which are good hydrogen abstractors and which will produce acid in the presence of hydrogen donors. Their use in photopolymerization processes is described in *Light Sensitive Systems: Chemistry and Application of Nonsilver Halide Photographic Processes*, J. Kosar, J. Wiley & Sons (New York, 1965), pages 180–181. Both the free radical halogen and the photoproduced acid have been used in various systems involving the photochemical formation and destruction of dyes, see the above Kosar citation, pages 361–370.

The use of sensitizers to broaden the spectral response of organic halogen compounds is known, and yellow azo dyes, styryl and leuco dye bases, and cyanine dyes are suitable for this purpose. Unfortunately most of such sensitizers cause serious stability problems under normal storage conditions prior to the use of the photosensitive sheet or film. Many of these known sensitizers contain a basic group, such as dimethylamino, which chemically reacts with the organic halogen compound, resulting in a reduction in or loss of photosensitivity, e.g., premature acid formation. Other known sensitizers, such as the cyanine dyes, are salts of strong acids and weak bases which, because of their acidity, will react with acid-sensitive components in the photosensitive system during storage. Moreover, because dyes in salt form are generally insoluble in organic solvents, they are often difficult to formulate and coat. Many can be made only be complicated synthesis and are expensive to prepare and to purify. Leuco dyes bases, besides being basic, are sensitive to oxygen and are therefore difficult to purify and to store. The yellow azo compounds are restricted in their absorption of light and in many cases do not effectively sensitize organic halogen compounds.

It is therefore an object of this invention to provide a novel sensitized photosensitive element having photolyzable organic halogen compounds.

Another object of this invention is to provide sensitized compositions containing photolyzable organic halogen compounds.

Still another object of this invention is to provide novel photosensitive copysheets and improved processes for their manufacture and use.

In accordance with this invention it has been found that photolyzable organic halogen compounds are sensitized to higher wavelengths of light in solution by one or more aromatic polycyclic compounds which have an ionization potential below about 7.4 these sensitizers are desirably essentially unreactive with said organic halogen compounds in the dark under ambient conditions, i.e., they are stable for periods of at least 3 months, preferably at least 6 months, under ambient conditions in the dark. For example, they are most preferably free of amine groups which react with organic halogen compounds in the absence of light. Illustrative aromatic polycyclic sensitizers meeting the aforementioned criteria include: perylene; rubrene; 2-ethyl-9,10-dimethoxyanthracene; tetraphenylpyrene; tetracene; pentacene; coronene; benzo-α-pyrene; benzo-α-naphthonapthracene; dibenzochrysene; benzopentaphene; rubicene; benzoperylene; trimethylazulene; decacyclene; diphenylanthracene; etc. The most preferred sensitizers are nonpolymeric, colored compounds.

Photolyzable organic halogen compounds capable of generating free radical halogen under the influence of light are known. Preferred photolyzable organic halogen compounds are nongaseous (i.e., solid or liquid) at room temperature and have a polarographic half wave reduction potential above about −0.9. Illustrative are hexabromoethane, tetrabromo-o-xylene, dibromotetrachloroethane, tribromotrichloroethane, pentabromoethane, dibromocyanoacetamide, tris-tribromomethyl-triazine, dibromodibenzoylmethane, triiodomethane, tetrabromodifluoroethane, tribromoquinaldine, hexachloro-p-xylene, etc.

Although the concentration ratio of sensitizer to organic halogen compound is not critical, generally the molar ratio is between 1/20 to 2/1, respectively, for maximum speed. Coatings, layers, films or sheets made with solutions of these organic halogen compounds and sensitizers, normally with a binder, are unusually stable and can be stored for long periods under ordinary room conditions. The resulting constructions absorb light well into the visible light spectrum. These sensitizers are soluble in organic solvents such as acetone, methyl ethyl ketone, monomethyl ether of ethylene glycol, etc., and are easily prepared and purified. Moreover, the high efficiency of these sensitizers makes it possible to use less expensive and nontoxic organic halogen compounds.

To illustrate the invention, solutions containing both $10^{-2}$ M of organic halogen compound and about $10^{-3}$ M of sensitizer in acetone were prepared. Twenty milliliters of each solution was exposed through a filter (Corning C.S. 3–74) which transmits light of wavelength greater than 390 millimicrons so that only the sensitizer was absorbing light. For the light exposure a medium pressure mercury vapor lamp (GEH3T7) was used to provide 0.07 watts/cm.$^2$ of incident energy. After exposure 2 ml. of each exposed solution was added to 1 ml. of an acid-base indicator solution of 0.005 g. of 4-phenylazo-1-naphthylamine in 100 ml. of isopropanol. The resulting solutions were then diluted to 10 ml. with isopropanol and the visible absorption spectra were measured. The log of the ratio of the two peaks was determined as $\log$ A/B where A is the absorption at 540 m$\mu$ (acid form) and B is the absorption at 437 m$\mu$ (base form). This value was then used to determine the amount of acid generated by comparing it to a previously calibrated straight line plot of acid concentration vs. log A/B, which was obtained by adding known amounts of acid solution (p-toluenesulfonic acid) to the dye solution and measuring the absorption peaks. The straight line portion of the plot occurs between the acid concentrations of $2\times10^{-5}$ M, and $9\times10^{-5}$ M, and the exposure time was adjusted to produce concentrations of acid in that range. Table I shows the results obtained with representative organic halogen compounds and sensitizers.

TABLE 1

| Organic halogen compound | Concentration, (M) | Sensitizer | Sensitizer concentration, (M) | Wave lengths, (m$\mu$) | Exposure time, (sec.) | Acid concentration, (M) |
|---|---|---|---|---|---|---|
| | | | | Total | 120 | $5.5\times10^{-5}$ |
| $C_2Br_6$ | $1.\times10^{-4}$ | None | | >390 | $^1$10 | None |
| $C_2Br_6$ | $7.\times10^{-2}$ | None | | >390 | 10 | $2.39\times10^{-5}$ |
| $C_2Br_6$ | $7.\times10^{-2}$ | 2-ethyl-9,10-dimethoxy anthracene | $7.\times10^{-2}$ | >390 | 10 | $6.97\times10^{-5}$ |
| $C_2Br_6$ | $7.\times10^{-2}$ | do | $3.5\times10^{-2}$ | >390 | 10 | $4.87\times10^{-5}$ |
| $C_2Br_6$ | $7.\times10^{-2}$ | do | $1.75\times10^{-2}$ | >390 | 15 | $3.56\times10^{-5}$ |
| $C_2Br_6$ | $7.\times10^{-2}$ | do | $7.\times10^{-3}$ | >390 | 30 | $3.38\times10^{-5}$ |
| $C_2Br_6$ | $7.\times10^{-2}$ | do | $2.8\times10^{-3}$ | >390 | 30 | $5.64\times10^{-5}$ |
| $C_2Br_6$ | $7.\times10^{-2}$ | do | $<7.\times10^{-3}$ | >390 | 165 | $2.03\times10^{-5}$ |
| Tetrabromo-o-xylene | $7.\times10^{-2}$ | do | $<7.\times10^{-3}$ | >390 | 10 | $4.0\times10^{-5}$ |
| Hexachloro-p-xylene | $7.\times10^{-2}$ | Perylene | $^27.\times10^{-3}$ | >390 | 90 | $3.84\times10^{-5}$ |
| Tetrabromo-o-xylene | $7.\times10^{-2}$ | Tetracene | $^27.\times10^{-3}$ | >390 | | |
| Tetrabromo-o-xylene | | | | | | |

TABLE I—Continued

| Organic halogen compound | Concentration, (M) | Sensitizer | Sensitizer concentration, (M) | Wave lengths, (mμ) | Exposure time, (sec.) | Acid concentration, (M) |
|---|---|---|---|---|---|---|
| Tetrabromo-o-xylene | $7. \times 10^{-2}$ | Benzonaphthonapthacene | [2] $7. \times 10^{-3}$ | >390 | 30 | $2.06 \times 10^{-5}$ |
| Tetrabromo-o-xylene | $7. \times 10^{-2}$ | Dibenzpyrene (1,2,4,5) | [2] $7. \times 10^{-3}$ | >390 | 30 | $3.2 \times 10^{-5}$ |
| $C_2Br_6$ | $7. \times 10^{-2}$ | Rubrene | [2] $7. \times 10^{-3}$ | >390 | 8 | $7.1 \times 10^{-5}$ |
| $C_2Br_6$ | $7. \times 10^{-2}$ | Coronene | [2] $7. \times 10^{-3}$ | >390 | 20 | $1.6 \times 10^{-5}$ |
| $CHBr_3$ | $7. \times 10^{-2}$ | Perylene | [2] $7. \times 10^{-3}$ | >390 | 10 | $8.0 \times 10^{-5}$ |

[1] Minutes. [2] Sat.

In general, the sensitization of photolyzable organic halogen compounds in liquid solutions occurs when the concentration of organic halogen compound is greater than about $10^{-2}$ M. These sensitized photolyzable organic halogen compounds may be used as a liquid solution in an organic solvent, e.g., a photobleachable ink, or as a solid solution in an inert organic binder, e.g., a photosensitive layer in a copysheet.

The enhanced sensitivity of the photolyzable organic halogen compounds is not restricted to any particular use, type of construction or imaging process. When coated onto a substrate with vinyl ethers, the photoproduced acid causes cationic polymerization of the ethylenically unsaturated monomer. When coated onto a substrate with acrylate esters, the photoproduced free radicals cause free radical polymerization of the ethylenically unsaturated monomer. Tacky polymerized areas are made nontacky by toner powder development, revealing the image. The unpolymerized and unexposed areas may be transferred to plain paper and then powder developed to give a copy of the original light image. The unpolymerized monomer may also be transferred to a water receptive metal surface and then polymerized to produce a lithographic plate. In still another application the photoproduced acid is used to effect the bleaching of dyes, resulting in high resolution positive or nonreversal copies of transparent graphic originals.

The sensitized systems of this invention are also useful in conjunction with tetrahydropyranyl derivatives of aromatic hydroxy and amino compounds, the photoproduced acid causing decomposition of these derivatives to generate the parent hydroxy or amino compounds which are capable of reducing silver or other metal complexes to form visible images.

Photosensitive films incorporating organic halogen compounds which undergo photodecomposition may also be sensitized in accordance with this invention. Illustrative photosensitive films of this type are shown in U.S. Pat. No. 3,081,165, their use being described in xerographic image recording processes characterized as "electrochemography." In these processes an electrostatic latent image is formed by exposure of an electrochemographically sensitive surface or layer to yield a conductivity latent image adapted to produce an electrostatic latent image by selective dissipation of an electrostatic surface charge, either once or repetitively without the necessity for successive exposures to an optical image.

The following examples will illustrate the use of the sensitized photolyzable organic halogen compound systems of this invention.

Example 1

The following solution was prepared.

1.0 gram of vinyloxyethylether of β-naphthol
0.5 gram cellulose acetate butyrate
0.075 gram hexabromoethane
50 ml. methyl ethyl ketone In 4.0 ml. of the above solution was dissolved 0.003 gram of 2-ethyl-9,10-dimethoxyanthracene. This solution was knife coated onto a polyester film at a knife setting of 2.0 mil. A sample of the dried coating was given a 2-second exposure through a suitable transparency with a tungsten light providing 15,000 foot-candles of incident light energy. The exposed sample was then placed against a sheet of ordinary paper and heated at 95° C. for 5 seconds. The paper was treated with a resin coated colored toner powder which selectively adhered to the paper in those areas corresponding to the unexposed portions of the original. Heating caused fusion of the colored toner powder, providing a positive copy of the original.

Example 2

The following solution was prepared.

32 grams of a 5% solution of cellulose ethyl ether (Ethocel N-200, a trademarked product of Dow Chemical Company) in acetone
0.3 gram of tetrabromodichloroethane
0.1 gram Rose Bengal N (Color Index No. 45440)
0.02 gram perylene The above solution was knife coated onto a polyester film at a knife setting of 4.0 mil. A 50-second exposure of a dried coated sample through a positive transparency to tungsten light of 15,000 foot-candles of incident light energy caused complete bleaching of the red colored Rose Bengal N dye to give a positive copy of the original transparency.

Example 3

The following solution was prepared.

3.0 grams of 5% solution of cellulose acetate butyrate in acetone
0.01 gram hexabromoethane
0.005 gram perylene
0.02 gram 1-(2-tetrahydropyranyloxy)-4-methoxynaphthalene It was knife coated onto a polyester film at a knife setting of 3.0 mil. A sample of the dried coating was exposed through a photographic negative for only 1 second to a tungsten light giving 1000 foot-candles incident light energy.

The exposed sample was then heated at about 100° C. while in contact with a receptor sheet containing a coating of

|  | Parts by Weight |
|---|---|
| Silver behenate | 12.6 |
| Phthalazinone toner | 5.2 |
| 2,6-ditertiarybutyl-4-methylphenol | 2.2 |
| Polyvinyl butyral binder | 19.8 |
| Zinc oxide powder | 50.0 |
| Polyterprene resin | 10.0 |

The liberated 4-methoxy-1-naphthol caused selective reduction of the silver behenate in the exposed areas to give a dense black-on-white negative copy of the original.

Example 4

The following solution was prepared.

10 ml. of 2% polymethylacrylate (molecular weight of about 100,000) in methylene chloride
0.1 g. hexabromoethane
0.1 g. 2-methyl-9,10-dimethoxyanthracene This solution was knife coated (3.0 mil wet thickness) onto a conductive backing, such as aluminum vapor coated polyester film. A sample of the coated film was provided with a negative surface electric charge in the absence of light by means of a negative corona discharge of 6,000 volts. The charged sample was then exposed through a transparent master to 100 foot-candles of incident tungsten light for 15 seconds and was placed in a standard electrostatic liquid developer bath. The toner powder in the developer was deposited in the unexposed areas to give a positive copy of the original master. This example illustrates the use of the sensitized compositions of this invention in an image recording media for electrochemography.

Various other embodiments of the present invention will be apparent to those skilled in the art without departing from the scope thereof.

What is claimed is:

1. In a photosensitive composition containing a photolyzable organic halogen compound and at least one spectral sensitizer therefor, the improvement which comprises using as a spectral sensitizer a colored acene compound which has an ionization potential below about 7.4 and is essentially unreactive with said organic halogen compound in the dark under ordinary room conditions.

2. The photosensitive composition of claim 1 in which said photolyzable organic halogen compounds are nongaseous compounds at room temperature.

3. The photosensitive composition of claim 1 in which said composition contains a compound which undergoes a chemical change in the presence of either a free radical halogen or an acid.

4. The photosensitive composition of claim 1 in which said composition contains a free radical polymerizable monomer.

5. The photosensitive composition of claim 1 in which said composition contains an acid polymerizable monomer.

6. The photosensitive composition of claim 1 in which said composition contains a compound which is capable of changing color in the acid environment created upon light exposure of a photolyzable organic halogen compound.

7. The photosensitive composition of claim 1 in which the molar ratio of said sensitizer to said organic halogen compound is from 1/20 to 2/1.

8. The photosensitive composition of claim 1 in which said acene compound is free of amine groups which react with said organic halogen compound in the absence of light.

9. A photosensitive layer containing the photosensitive composition of claim 1.

* * * * *